United States Patent
Batchelor et al.

(10) Patent No.: US 6,912,851 B2
(45) Date of Patent: Jul. 5, 2005

(54) HYDRAULIC BRAKE VALVE

(75) Inventors: Mark Batchelor, Newport (GB);
Michael Williamson, Newport (GB);
David Parry, Cwmbran (GB)

(73) Assignee: ArvinMeritor Light Vehicle Systems (UK) Ltd., Stirchley (GB)

(*) Notice: Subject to any disclaimer, the term of this patent is extended or adjusted under 35 U.S.C. 154(b) by 21 days.

(21) Appl. No.: 10/635,225

(22) Filed: Aug. 6, 2003

(65) Prior Publication Data
US 2004/0070266 A1 Apr. 15, 2004

(30) Foreign Application Priority Data
Aug. 6, 2002 (GB) .............................................. 0218167

(51) Int. Cl.[7] .............................................. B60T 11/30
(52) U.S. Cl. .................................... 60/584; 137/533.21
(58) Field of Search ................... 60/533, 584; 137/519, 137/533.21, 511, 515.13, 515.3, 515.5, 538, 489.3, 514.7; 188/352

(56) References Cited

U.S. PATENT DOCUMENTS

| | | | | |
|---|---|---|---|---|
| 558,034 A | * | 4/1896 | Brown et al. | 137/533.21 |
| 2,223,699 A | * | 12/1940 | Norgren | 137/533.21 |
| 2,441,911 A | * | 5/1948 | St Clair | 137/533.21 |
| 3,598,145 A | * | 8/1971 | Wolfson | 137/533.21 |
| 5,394,701 A | * | 3/1995 | Durant et al. | 60/533 |
| 6,179,392 B1 | * | 1/2001 | Baechle et al. | 188/352 |

FOREIGN PATENT DOCUMENTS

| | | |
|---|---|---|
| EP | 0 329 333 A | 8/1989 |
| EP | 0 338 247 A | 10/1989 |
| GB | 0663780 | 12/1951 |
| GB | 1033653 | 6/1966 |
| GB | 2086543 | 5/1982 |
| GB | 2122726 | 1/1984 |
| GB | 2 127 919 A | 4/1984 |
| GB | 2127919 | 4/1984 |
| GB | 2152143 | 7/1985 |
| WO | WO 00 18626 A | 4/2000 |

OTHER PUBLICATIONS

European Search Report, dated Oct. 24, 2003.

* cited by examiner

Primary Examiner—Thomas E. Lazo
(74) Attorney, Agent, or Firm—Carlson, Gaskey & Olds

(57) ABSTRACT

A hydraulic brake valve comprising a body, a passageway defined in the body, an inlet to the passageway, an outlet from the passageway and a movable valve member in the passageway, the valve member is movable between a first position blocking the passageway to prevent communication between the inlet and the outlet, and a second position opening the passageway to allow communication between the inlet and the outlet in response to a pressure differential exceeding a predetermined value. The valve member remains in its second position once it has been moved to its second position.

21 Claims, 3 Drawing Sheets

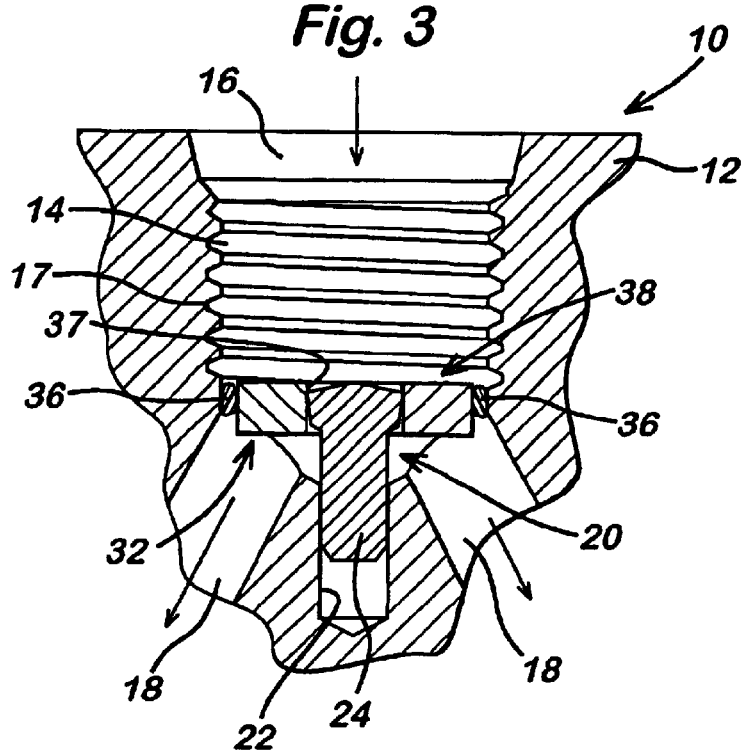
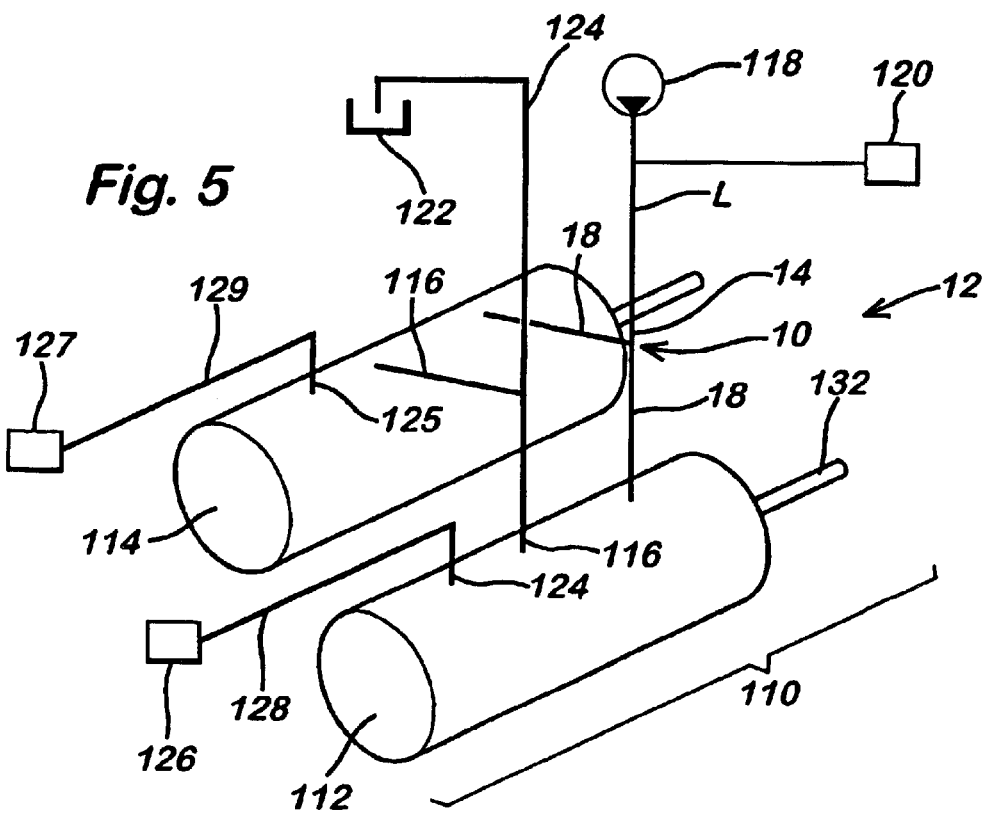

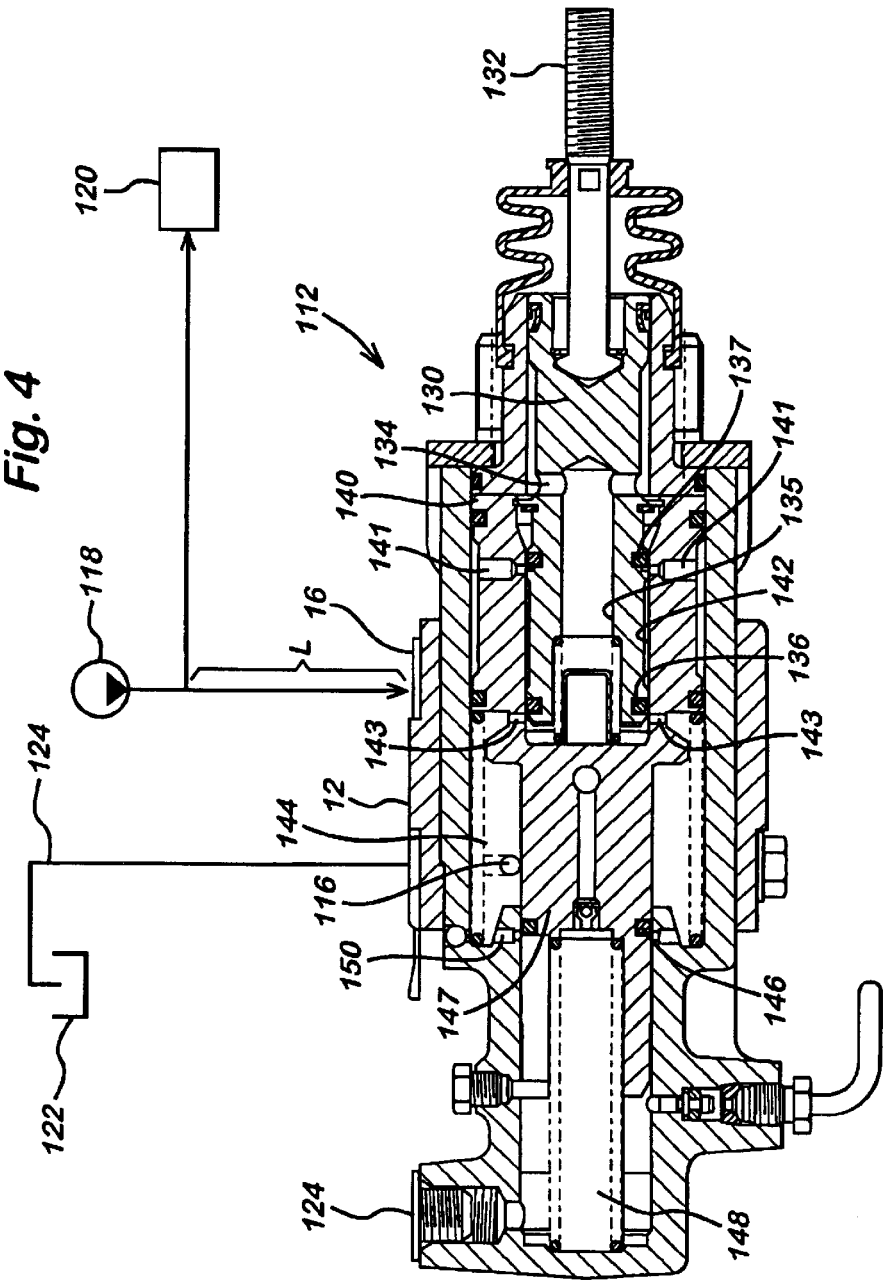

HYDRAULIC BRAKE VALVE

REFERENCE TO RELATED APPLICATIONS

This application claims priority to United Kingdom (GB) patent application No. 0218167.5 filed on Aug. 6, 2002.

TECHNICAL FIELD

The present invention relates to hydraulic brake valves and in particular, although not exclusively, to a vacuum bleeding device for use in hydraulic servo brakes.

BACKGROUND OF THE INVENTION

It is necessary to bleed vehicle hydraulic systems during the vehicle assembly process. The bleeding is usually completed on the vehicle assembly line using vacuum bleeding equipment, which creates a vacuum within the sealed hydraulic system. The system is then vented to a hydraulic fluid, and atmospheric pressure forces the hydraulic fluid into the system. Fluid may also be forced into the system under pressure. Equipment such as this can reduce the time to complete the bleeding process, which correspondingly speeds up the assembly line and decreases the cost of vehicle production. It may also eliminate air pockets from difficult to bleed places. Typically, the vacuum will be applied to the hydraulic reservoir (or tank), which is necessarily readily acceptable due to the requirement of checking the fluid level, and topping up as necessary in service. During vacuum bleeding, direct access is not required to bleed nipples located at the brake slave cylinders, often located adjacent respective wheels.

Thus, vacuum bleeding is particularly applicable for use on a vehicle assembly line, though is less applicable for in service use, since the equipment required to vacuum bleed is expensive.

Problems can arise during vacuum bleeding if any component of the hydraulic system is not fully sealed from the atmosphere. Particular problems arise when using complex hydraulic or vacuum boosters in the system. Some systems use spool valves that may create a leak path from the atmosphere during the bleeding operation. A sufficient vacuum sometimes cannot be held because of leak paths, which cause inefficient bleeding. The leak paths need to be plugged to maintain a vacuum. This additional step increases the time of the bleeding process, which correspondingly slows down the assembly line and increases the cost of vehicle production. Furthermore, where the system is connected to a hydraulic pump, the pump itself is incapable of holding a sufficient vacuum. Thus, either air can be sucked through the pump when the pump has not been hydraulically primed, or alternatively hydraulic fluid can be sucked through the pump (when it has been hydraulically primed), creating a danger that the hydraulic fluid will enter and contaminate the vacuum bleeding equipment.

It is an aim of the present invention to overcome the problems described above by providing a device placed in an hydraulic system to isolate a potential leak path so that a vacuum can be held during bleeding. The evacuated part of the system can then be filled with hydraulic fluid.

It is a further aim of the invention to eliminate the step of plugging a potential leak path. Plugging requires human intervention, which introduces a potential source of mistakes and increases the time to complete the vacuum bleeding operation because the plug must be removed.

SUMMARY OF THE INVENTION

The invention is directed to a hydraulic brake valve comprising a body, a passageway defined in the body, an inlet to the passageway, an outlet from the passageway and a movable valve member in the passageway. The valve member has a first position blocking the passageway to prevent communication between the inlet and the outlet and a second position that keeps the passageway open to allow communication between the inlet and the outlet in response to a pressure differential exceeding a predetermined value. The valve member remains in its second position once it has been moved to its second position. Such a valve is particularly adapted to hydraulic servo braking systems and is adapted to remain in the first position on evacuation of the system on the outlet side.

The valve preferably uses a standard hydraulic port design and associated connectors so that it can be fitted directly in the hydraulic system without the need for changes to the fittings. The valve further reduces the risk of spilling hydraulic fluid during the bleeding process by ensuring that potential leak paths are closed.

The inventive valve eliminates the additional operation of plugging a leak path in the hydraulic system prior to vacuum bleeding. This has the advantage of reducing the time to bleed a system. The valve consequently allows efficient vacuum bleeding of systems having spools and other components having a potential leak path. Furthermore, the valve is adapted to open automatically upon pressurization of the system from the inlet side. Typically a pressurized supply (pressurized by an engine or other power driven pump) will open the valve upon the first brake application of a hydraulic braking system.

It will be appreciated that other embodiments according to the invention are possible which have the same effect with the proviso that the valve member is designed so as to resist a vacuum force and is movable in response to a large pressure differential.

The invention is also directed to a method of bleeding a hydraulic brake system including steps of: providing a hydraulic brake system having a first side, and a second side; providing a hydraulic brake valve, comprising a body, a passageway defined in the body, an inlet to the passageway, an outlet from the passageway and a movable valve member in the passageway, wherein the valve member has a first position blocking the passageway to prevent communication between the inlet and the outlet, and a second position opening the passageway to allow communication between the inlet and the outlet in response to a pressure differential exceeding a predetermined value, the inlet being in hydraulic communication with said first side and said outlet being in hydraulic communication with said second side; bleeding the first side, then operating the hydraulic brake system to open the valve passageway to allow communication between the first and the second side of the hydraulic brake system.

BRIEF DESCRIPTION OF THE DRAWINGS

The features of the valve to which the invention relates will be described in more detail with reference to the appended drawings in which:

FIG. 3 is a diagrammatic axial section through a valve according to a second embodiment of the invention with the valve member in the first position.

FIG. 4 is a cross section of a generally known brake booster which has had inlet 16 adapted to provide for the present invention.

FIG. 5 is a schematic isometric view of FIG. 4.

DETAILED DESCRIPTION OF THE EMBODIMENTS

Figure 1:
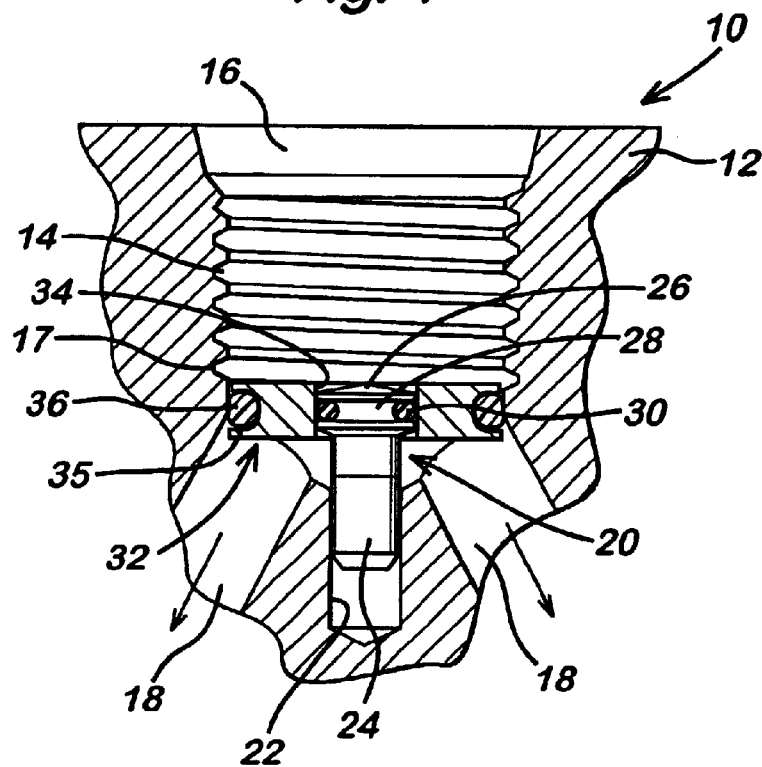
FIG. 1 is a diagrammatic axial section through a valve according to the invention with the valve member in the first position.

Generally, the invention is directed to a hydraulic brake valve comprising a body, a passageway defined in the body, an inlet to the passageway, an outlet from the passageway and a movable valve member in the passageway. The valve member has a first position blocking the passageway to prevent communication between the inlet and the outlet, and a second position that keeps the passageway open to allow communication between the inlet and the outlet in response to a pressure differential exceeding a predetermined value. The valve member remains in its second position once it has been moved to its second position. The inventive valve is particularly adapted to hydraulic servo braking systems and is adapted to remain in the first position on evacuation of the system on the outlet side, typically to a pressure differential of 1 bar or more.

The valve preferably uses a standard hydraulic port design and associated connectors so that it can be fitted directly in the hydraulic system without requiring any changes to the fittings. The valve further reduces the risk of spilling hydraulic fluid during the bleeding process by ensuring that potential leak paths are closed.

The inventive valve therefore eliminates the additional operation of plugging a leak path in the hydraulic system prior to vacuum bleeding, reducing the time to bleed a system. The valve consequently allows efficient vacuum bleeding of systems having spools and other components that create a potential leak path. Furthermore, the valve is adapted to open automatically on pressurization of the system from the inlet side. Typically, a pressurized supply (pressurized by an engine or other power driven pump) will open the valve upon the first brake application of a hydraulic braking system.

The valve member may be slidable in a bore of the passageway and is retained by a retaining means to maintain the valve member in the bore in the first position.

In one embodiment, the body further comprises a recess where the valve member is movable into the recess in the second position. Preferably the valve member is also in the recess in the first position. This has the advantage that the valve member and recess cooperate to guide the valve member to the second position.

Advantageously, the recess is cylindrical which allows for easy machining of the recess. In one embodiment, the valve member has a spigot located in the recess. The spigot may be cylindrical, and in one embodiment the spigot is a taper lock fit in the recess when the valve member is in the second position. The taper lock fit advantageously holds the spigot securely to prevent the valve member from moving back to the first position. In this embodiment the valve member has a circular head wherein the head is slidable in a bore of the passageway. The head and spigot are preferably coaxial. The diameter of the head is preferably larger than the maximum dimension of the mouth of the recess.

In one embodiment, the head or the bore has a circumferential groove having an elastomeric seal therein to seal the head to the associated bore until a predetermined threshold pressure of the inlet is exceeded. The seal therefore defines a retaining means. In one embodiment, the seal is in a groove of the head. Further, in one embodiment the head is the end stop for the valve member in the second position.

In one embodiment, the body includes a valve housing inserted in the passageway, wherein the valve housing defines the bore. The housing or valve member may have a circumferential groove having an elastomeric seal therein to seal the housing to the valve member.

According to another embodiment of the present invention, the valve member is molded to the body with a controlled thickness membrane to form a single molded unit. The membrane is designed to be robust enough to withstand the vacuum force and has the advantage that only one elastomeric seal is required. In another embodiment, the valve member is molded to the valve housing with a controlled thickness membrane to form a single molded unit.

Other embodiments according to the invention are possible which have the same effect as long as the valve member is designed to resist a vacuum force and is movable in response to a large pressure differential.

The invention is also generally directed to a method of bleeding a hydraulic brake system having a first side, and a second side, a hydraulic brake valve comprising a body, a passageway defined in the body, an inlet to the passageway, an outlet from the passageway and a movable valve member in the passageway. The method is used in a valve member having a first position blocking the passageway to prevent communication between the inlet and the outlet, and a second position opening the passageway to allow communication between the inlet and the outlet in response to a pressure differential exceeding a predetermined value, where the inlet is in hydraulic communication with the first side and where the outlet is in hydraulic communication with the second side.

The method itself comprises bleeding the first side, then operating the hydraulic brake system to open the valve passageway to allow communication between the first and the second side of the hydraulic brake system.

The invention will now be described in more detail with respect to the Figures. FIG. 1 shows an in-line vacuum bleed valve 10 in accordance with one embodiment of the invention. The valve 10 has a body 12 formed with a passageway 14. In this example, the body 12 is a part of a brake booster housing, but this need not be the case. The passageway 14 has an inlet 16 having a screw thread 17. The passageway 14 is also provided with outlets 18 and a movable valve member 20 within the passageway 14. The valve member 20 is illustrated in a first position blocking the passageway 14, thereby preventing communication between the inlet 16 and the outlet 18.

Also shown in FIG. 1 is a cylindrical recess 22 coaxial with the passageway 14 in which the valve member 20 is located. A cylindrical spigot 24 of the valve member 20 is slidable in the recess 22. The upper portion of the spigot 24 has a slight outward taper, for reasons which will be explained.

The valve member 20 has a circular head 26 which is larger than the maximum diameter of the recess 22. The head 26 has a circumferential groove 28 having an elastomeric seal 30 therein.

Further shown in FIG. 1 is a valve housing 32 inserted in the passageway 14 of the body 12. The valve housing 32 defines a bore 34 within which the head 26 of the valve member 20 is slidable. The housing 32 has a circumferential groove 35 having an elastomeric seal 36 therein to provide a seal between the housing 32 and the wall of the passageway 14.

Figure 2:
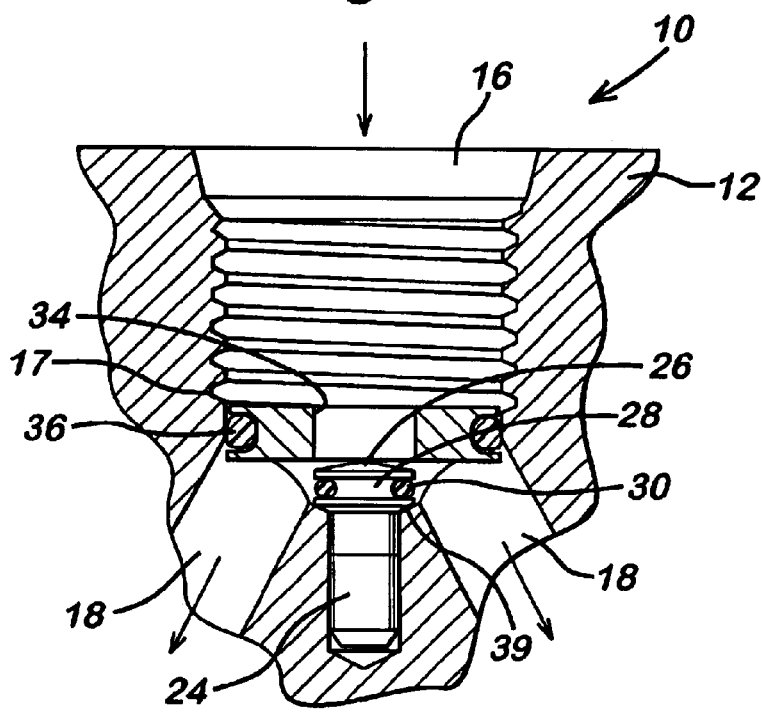
FIG. 2 corresponds to FIG. 1 and shows the valve member in the second position.

In the condition shown in FIG. 1, the valve member 20 prevents communication between the inlet 16 and the outlets 18. FIG. 2 illustrates the valve 10 with the valve member 20 in a second position permitting communication between the inlet 16 and the outlets 18. The head 26 of the valve member 20 is illustrated as an end stop abutting against a shoulder 39 surrounding the opening of the recess 22. Alternatively, the aforesaid taper at the upper portion of the spigot 24 jams into the upper end of the recess and holds the valve member 20 in place so that it cannot take part in any further operation of the valve 10.

In one embodiment, the valve can be used with the hydraulic booster system shown in FIGS. 4 and 5. Such a system is known to those skilled in the art, and is typically used on agricultural tractors to provide for independent braking of a rear left hand wheel and a rear right hand wheel.

FIG. 5 shows a schematic layout of a possible hydraulic booster system in which the in inventive valve can be used.

A hydraulic booster 110 includes a cast body 12 which includes a left-hand combined booster and master cylinder body portion 112, a right-hand combined booster and master cylinder body portion 114, outlets 18 and tank connections 116. In one embodiment, these major features are formed as a single casting.

It would be appreciated from the above description that the valve 10 and valve member 20 are located at the junction of outlets 18 and passageway 14 as indicated. In use, the passageway 14 is supplied with hydraulic fluid from the pump 118, which also supplies hydraulic fluid to ancillary equipment, in this case the spool valves 120. The pump will typically be driven by a power source, such as the vehicle engine. The tank connections 116 return fluid to the tank 122 via the hydraulic line 124. The left-hand body portion 112 has a master cylinder outlet 125 which supplies pressurized fluid to the left-hand slave cylinder 126 via the hydraulic line 128. The right-hand combined booster and master cylinder body portion 114 has a similar master cylinder outlet 125, which supplies pressurized fluid to the right-hand slave cylinder 127 via the hydraulic line 129.

FIG. 4 shows a cross section of the left-hand combined booster and the master cylinder body portion 112. The body portion 112 includes a booster plunger 130, which can be forced to the left when viewing FIG. 4, by a left-hand brake pedal (not shown) acting on push rod 132. The booster plunger 130 includes a cross-drilling 134, a central bore 135, a plunger forward seal 136 and a plunger rearward seal 137.

A booster piston 140 includes booster pressure inlet holes 141 connected to an appropriate outlet 18. The booster piston further includes a bore 142 that receives the left hand end of the booster plunger 130. Vent holes 143 are provided at the left-hand end of the bore 142 to allow used oil to vent to the recuperation chamber 144, which is in turn connected directly to the tank connection 116. The left-hand end of booster piston 140 includes a master cylinder seal 146 mounted on a cylindrical portion 147. The seal 146 and the cylindrical portion 147 together form a master cylinder piston, which is capable of pressurizing hydraulic fluid in the master cylinder chamber 148 to apply the left-hand brake. With the various components in the position as shown in FIG. 4, a self-bleed hole 150 hydraulically connects the master cylinder chamber 148 with the recuperation chamber 144.

Operation of the booster is as follows. When an operator applies the left-hand brake, the push rod 132 is forced to the left, thereby moving booster plunger 130 to the left. The plunger forward seal 136 closes the vent holes 143, and simultaneously the plunger rearward seal 137 moves past the booster pressure inlet holes 141. This hydraulically connects pump 118 with the central bore 135 via the booster pressure inlet holes 141 and the cross drilling 134. The pressurized fluid then acts on the booster plunger 130, which has a cross-sectional area=area 1, and the booster piston 140, which has a cross-sectional area=area 2. Because area 2 is larger than area 1, the force seen at the booster piston (and hence at the master cylinder piston) is greater than the pedal force applied to the plunger 132 by the ratio of area 2/area 1. Thus, it can be seen that the booster acts as a servo brake system to increase the pedal effort force.

When the brakes are released, the components return to the position shown in FIG. 4 whereupon the vent holes 143 are reopened allowing the pressurized hydraulic fluid in central bore 135 to vent to tank. Additionally, the self bleed hole 150 is reopened allowing recuperation of the master cylinder chamber from the recuperation chamber.

The right-hand combined booster and the master cylinder operates in a substantially identical manner when the right-hand brake pedal is applied. The right and left hand brake pedals are individually operable. However, they typically may be selectively mechanically coupled together if the operator so desires so that the right and left hand wheel brakes are applied simultaneously.

The valve 10 operates in the following manner. The hydraulic system on the outlet side 18 of the valve 10 is firstly evacuated as indicated by the large arrows in FIG. 1. This is achieved by applying a vacuum to the tank 122. This evacuates the air in recuperation chamber 144 and the master cylinder chamber 148 (since the self-bleed hole 150 is open) and hence evacuates the air in the hydraulic line 128 and left-hand slave cylinder 126. The central bore 135 and cross drilling 134 are similarly evacuated of air. Equivalent sections of the right-hand brake system will be simultaneously evacuated of air.

The plunger forward seal 136 and plunger rearward seal 137 are primarily designed to seal hydraulic fluid. As such, they may not be capable of holding the vacuum required for vacuum bleeding. Thus, depending on the integrity of seals 136 and 137, the boost pressure inlet holes 141 may also be evacuated. However, the valve 10 is specifically designed to be able to hold a vacuum and hence no vacuum is applied to the spool valves 120 or the hydraulic pump 118. In this way, the valve 10 prevents air or hydraulic fluid from entering either of the combined booster and master cylinder body portions.

Once the air has been evacuated, the vacuum bleeding apparatus vents the system to a hydraulic fluid, which enters the system under the action of atmospheric pressure.

When the vehicle engine is switched on, the hydraulic pump 118 is driven. Depending on the particular installation, the hydraulic pump will produce a pressure of typically 18–25 bar. However, some applications might fall outside this range. For example, some systems operate at a pressure or 15 bar, while other systems operate at a pressure of 40 bar. When either the right or left hand brake pedals are depressed for the first time, the hydraulic pressure from the pump acts to open the valve member. Any residual air, for example in line L, is then purged through the booster as the brake pedal is operated. It would be appreciated that such air will pass through the pressure inlet holes 141, the cross drilling 134, the central bore 135, the vent hole 143, the recuperation chamber 144, and then to the tank. Clearly any such air will not pass into the master cylinder chamber, which therefore remains in its fully bled condition.

The seal 30 in the groove 28 of the head 26 and the seal 36 in the groove 35 are capable of withstanding the force generated by the vacuum and are designed not to leak air. The head 26 is designed around an interference fit of the seal 30 such that the strain energy caused by the interference fit exerts a radial force sufficiently high enough to be greater then the force developed from full vacuum pressure (1 bar). During this phase of the filling operation, the valve member 20 remains in the first position as shown in FIG. 1. As mentioned above the outlet 18 is then connected to a supply of hydraulic fluid and atmospheric pressure forces the fluid into the system between the valve and the brake cylinders. The hydraulic fluid may also be under pressure to assist in the filling operation.

As mentioned above, upon first application of hydraulic pressure to the inlet side 16 of the valve 10 at a predetermined pressure value, in this case during a brake actuation when the pump is providing a supply of pressurized hydraulic fluid, the valve member 20 moves out of the bore 34 and into the second position as illustrated in FIG. 2. This opens the passageway 14 and permits communication between the inlet 16 and the outlets 18. As mentioned above, a typical value for the hydraulic pressure upon first application is in the range 15–40 bar. However, the valve 10 in one embodiment is designed to open at an intermediate pressure between 1 bar and the operating pressure of the particular pump. This will allow for tolerance errors while still ensuring that the valve is capable of maintaining the 1 bar vacuum pressure and ensuring that the valve can be opened by the application of the pressurized hydraulic fluid. Thus, the valve will be designed to open at, for example, 5 bar, which gives a sufficient safety margin over the 1 bar requirement for remaining closed and additionally gives a sufficient safety margin below the pump operating pressure (e.g., 15 bar). The flow of hydraulic fluid during the first application of hydraulic pressure on the inlet side 16 is indicated by the arrows in FIG. 2.

The spigot 24 of the valve member 20 is arranged slidably in the recess 22 in the first position as illustrated in FIG. 1. The valve member 20 moves further into the recess 22 when the valve member 20 moves into the second position as illustrated in FIG. 2. The valve 10 then remains in the second position thereafter so that the normal function of the hydraulic system can resume. Once open, the valve 10 allows hydraulic fluid to flow freely through the passageway 14 upon demand.

A second embodiment of the present Invention is illustrated in FIG. 3 with the valve member in the first position. Features common to the embodiment of FIGS. 1 and 2 are shown with like reference numerals. In this embodiment, the valve member 20 is molded to the valve housing 32 by a controlled thickness membrane 37 to form a single molded unit 38. The membrane 37 is designed to be adequately robust to withstand the vacuum force (e.g., 1 bar). This allows the valve member 10 to include only one elastomeric seal 36. On first application of the brake pedal, the membrane 37 breaks and the valve member 20 moves into the second position, abutting against the shoulder 39 in FIG. 2. Alternatively, the valve member is retained in the second position by the outwards taper as previously described.

While preferred embodiments for the valve have been described, it will be appreciated that braking pressure is an order of magnitude greater than the vacuum bleeding pressure. The forces required to hold the valve member in place can necessarily have a large tolerance band and could be achieved by any number of alternative designs.

It will be appreciated that the only modification to the housing of the booster shown in FIG. 4 is the drilling of the recess 22. Where the use of a standard booster is required, the body 12 could form a separate component from the booster valve housing. In this alternative form, it could be located anywhere along the line L (see FIG. 4). Preferably, the body 12 would then have suitable male and/or female fittings to easily connect it in its appropriate position in the circuit.

In particular, the body could have a male outlet fitting suitably to be screwed into the female inlet (16) of a standard non-modified booster. It will be appreciated that such an alternative valve needs only one outlet (rather than the two outlets 18 shown in FIG. 1). Indeed, in further embodiments the body 12 can form part of a housing of a master cylinder or brake booster which has only one outlet 18.

The present invention is also applicable to other servo braking systems which use a hydraulic pump to apply servo assistance for braking.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A hydraulic brake valve comprising:
   a body having a passageway;
   an inlet to the passageway;
   an outlet from the passageway; and
   a valve member moveable in the passageway, the valve member moveable between a first position blocking the passageway to prevent communication between the inlet and the outlet and a second position opening the passageway to allow communication between the inlet and the outlet in response to a pressure differential exceeding a predetermined value, said predetermined value being greater than 1 bar, wherein the valve member will remain in the first position when the inlet is at a pressure of 1 bar greater than a pressure of the outlet and the valve member stays in the second position after it has been moved to the second position.

2. The hydraulic brake valve according to claim 1, wherein the body further comprises a recess and the valve member is movable in the recess and the valve member is disposed in the recess in the first position and the valve member further comprises a spigot disposed in the recess wherein the spigot is a taper lock fit in the recess in the second position.

3. The hydraulic brake valve according to claim 1, wherein the body has a valve housing inserted in the passageway which defines bore, and the valve member is slidable in the bore.

4. The hydraulic brake valve according to claim 3 further comprising a retaining means that maintains the valve member in the bore in the first position.

5. The hydraulic brake valve according to claim 4, wherein the retaining means is an elastomeric seal disposed between the valve member and the bore.

6. The hydraulic brake valve according to claim 4, wherein the valve member is molded to the valve housing by a frangible membrane which acts as the retaining means.

7. The hydraulic brake valve according to claim 1, wherein the body forms of a part, housing in at least one of a brake booster and a master cylinder.

8. The hydraulic brake valve according to claim 1 wherein the valve member stays permanently in the second position after it has been moved to the second position.

9. A method of bleeding a hydraulic brake system having a first side, a second side, a passageway, an outlet from the passageway, and a movable valve member in the passageway, the valve member moveable between a first position blocking the passageway to prevent communication between the inlet and the outlet and a second position opening the passageway to allow communication between the inlet and the outlet in response to a pressure differential exceeding a predetermined value, the inlet being in hydraulic communication with said first side and said outlet being in hydraulic communication with said second side, the method comprising:

a) providing a leak path between the first side and atmosphere;

b) bleeding the second side; and c) operating the hydraulic brake system to open the valve member to allow communication between the first side and the second side of the hydraulic brake system.

10. The method of bleeding a hydraulic brake system as defined in claim 9, further comprising the step of supplying a pressurized supply of fluid to the inlet after said step b) and thereby applying the pressurized supply of fluid to the valve member to open the passageway.

11. The method as defined in claim 9 wherein said step c) includes moving the valve member to the second position and permanently maintaining the valve member in the second position thereafter.

12. The method as defined in claim 9 wherein said system includes one of a brake booster and a master cylinder and said passageway is formed in a housing of said one of said brake booster and master cylinder.

13. The method as defined in claim 12 wherein a valve housing is inserted in the passageway and the valve housing defines a bore and the valve member is slideable in the bore.

14. The method as defined in claim 12 wherein the housing further comprises a recess and the valve member is moveable in the recess and the valve member further comprises a spigot disposed in the recess wherein the spigot is a taper lock fit in the recess in the second position.

15. A hydraulic booster system, comprising:

at least one combined booster and master cylinder body having a passageway;

a hydraulic brake valve having an inlet to the passageway; an outlet from the passageway; and a valve member moveable in the passageway, the valve member moveable between a first position blocking the passageway to prevent communication between the inlet and the outlet and a second position opening the passageway to allow communication between the inlet and the outlet in response to a pressure differential exceeding a predetermined value, wherein the valve member stays permanently in the second position after it has been moved to the second position.

16. The hydraulic booster system of claim 15, wherein said at least one combined booster and master cylinder body comprises a right hand body and a left hand body, each of the right hand body and the left hand body having an associated passageway and hydraulic brake valve.

17. The hydraulic booster system of claim 15, wherein the valve member is slideable in a bore of the passageway, and further comprising a retaining means that maintains the valve member in the bore in the first position.

18. The hydraulic booster system of claim 17, wherein the retaining means is an elastomeric seal disposed between the valve member and the bore.

19. The hydraulic booster system of claim 17, wherein the body has a valve housing inserted in the passageway which defines the bore and the valve member is molded to the valve housing by a frangible membrane which acts as the retaining means.

20. The hydraulic booster system as defined in claim 15 wherein the valve member will remain in the first position when the inlet is at a pressure of 1 bar greater than a pressure of the outlet and wherein said predetermined value is greater than 1 bar.

21. The hydraulic booster system as defined in claim 15 wherein the body further comprises a recess and the valve member is moveable in the recess and the valve member further comprises a spigot disposed in the recess and the spigot is a taper lock fit in the recess in the second position.

\* \* \* \* \*

UNITED STATES PATENT AND TRADEMARK OFFICE
CERTIFICATE OF CORRECTION

PATENT NO. : 6,912,851 B2
DATED : July 5, 2005
INVENTOR(S) : Batchelor et al.

It is certified that error appears in the above-identified patent and that said Letters Patent is hereby corrected as shown below:

Column 8,
Line 37, please insert -- wherein -- after "and" and before "the".
Line 48, please insert -- a -- after "defines" and before "bore".
Line 60, "forms of a part" should read as -- forms part of a --.

Signed and Sealed this

Thirtieth Day of August, 2005

JON W. DUDAS
*Director of the United States Patent and Trademark Office*